(No Model.)

R. T. ADDY.
BICYCLE BRAKE.

No. 544,556. Patented Aug. 13, 1895.

WITNESSES:
William Gaebel
Geo. Hostetz

INVENTOR
R. T. Addy
BY
Munn & Co
ATTORNEYS.

UNITED STATES PATENT OFFICE.

RICHARD T. ADDY, OF WALLINGFORD, CONNECTICUT.

BICYCLE-BRAKE.

SPECIFICATION forming part of Letters Patent No. 544,556, dated August 13, 1895.

Application filed October 31, 1894. Serial No. 527,529. (No model.)

*To all whom it may concern:*

Be it known that I, RICHARD T. ADDY, of Wallingford, in the county of New Haven and State of Connecticut, have invented a new and Improved Bicycle-Brake, of which the following is a full, clear, and exact description.

The object of the invention is to provide a new and improved bicycle-brake which is simple and durable in construction, very effective in operation, arranged to tightly brake the wheel when applied, and not liable to wear on or otherwise injure the tire of the wheel.

The invention consists of certain parts and details and combinations of the same, as will be fully described hereinafter and then pointed out in the claims.

Reference is to be had to the accompanying drawings, forming a part of this specification, in which similar letters of reference indicate corresponding parts in all the figures.

Figure 1:
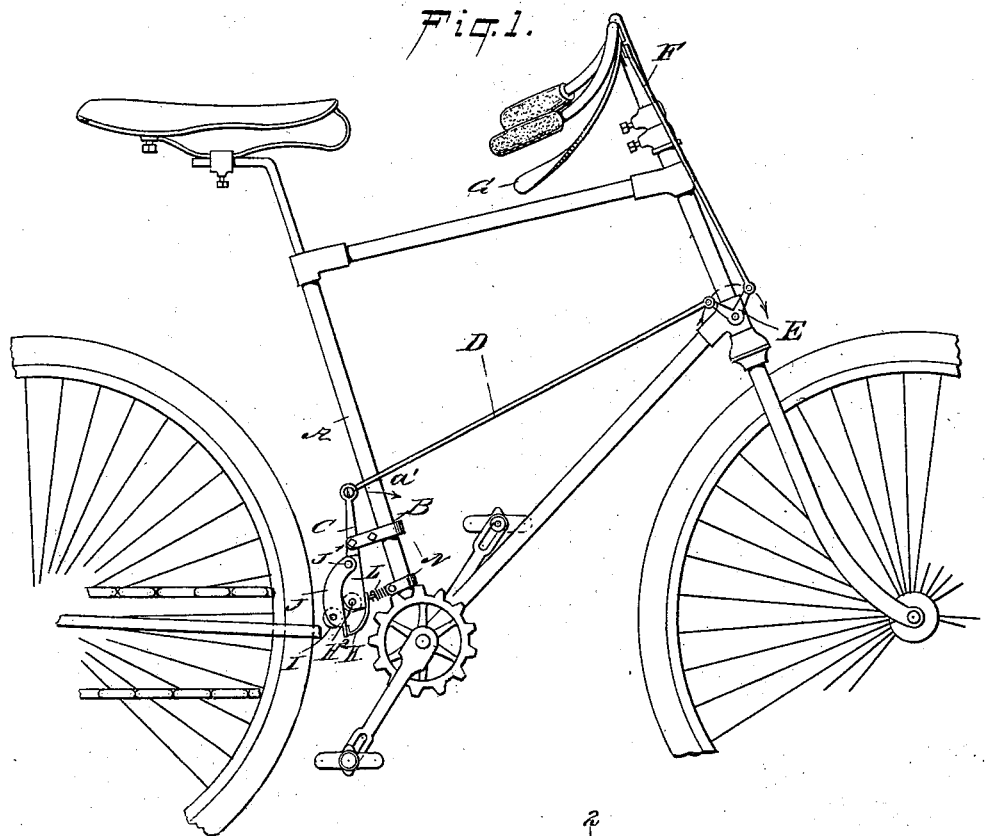
Figure 2:
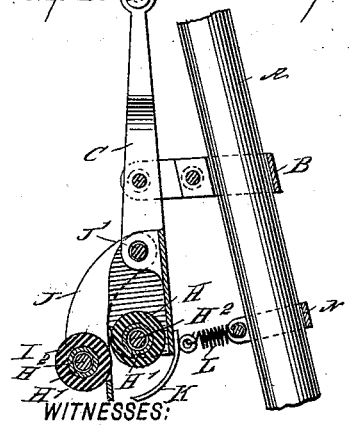
Figure 3:
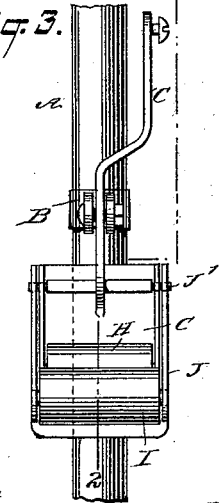
Figure 5:
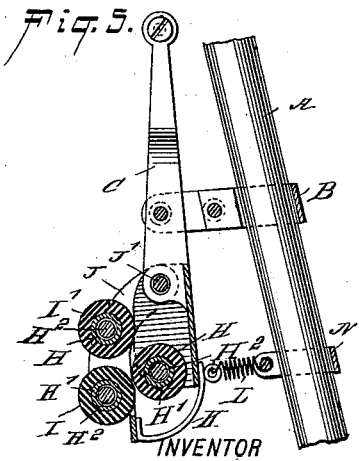
Figure 4:
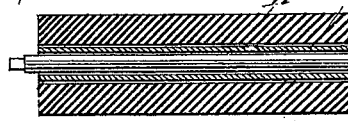

Figure 1 is a side elevation of the improvement as applied. Fig. 2 is an enlarged sectional side elevation of the improvement on the line 2 2 of Fig. 3. Fig. 3 is a rear elevation of the same. Fig. 4 is an enlarged sectional elevation of one of the rollers, and Fig. 5 is a sectional side elevation of a modified form of the improvement.

On the connecting-bar A of the bicycle-frame is held a clip B, on which is fulcrumed the brake-lever C, connected by a rod D with a bell-crank lever E, connected by a link F with the lever G fulcrumed on the handle-bar and under the control of the operator having hold of the handle-bar.

The brake-lever C is formed at its lower end with a casing, in the sides of which is journaled a roller H, made of rubber or other material, elastic or otherwise, and this roller is adapted to be engaged by a brake-roller I, journaled in the sides of a frame J, fulcrumed at J' on the lever C. The brake-roller I is adapted to engage the tire of the wheel to be braked, but normally is held out of frictional contact with the tire by a spring K connecting the lower end of the lever C with the frame J.

The lever C is held normally in the position shown in Figs. 1 and 2 by a spring L attached at one end to the lever C and at its other end to a clip or band N secured to the connecting-bar A. The rollers I and H are normally held out of frictional contact with each other; but when the operator manipulates the lever G then a pull is exerted on the rod D to impart a swinging motion to the lever C in the direction of the arrow $a'$, whereby the roller I is moved in frictional contact with the tire of the wheel to be braked. At the same time the resistance offered by the tire of the wheel causes a forward swinging of the frame J, so as to bring the roller I in frictional contact with the roller H. Now, it will be seen that the rotating wheel to be braked imparts a rotary motion to the roller I, and the latter imparts a similar motion to the other roller H, so that considerable friction is obtained at the contacting surfaces of the rollers, whereby the bicycle-wheel is tightly braked. It will further be seen that the operator by pressing the lever G with more or less force can increase or decrease the friction, so that the wheel of the bicycle is braked with more or less force. As soon as the operator releases the lever G and the brake-lever C returns to its normal position by the action of its spring L, the frame J carrying the roller I likewise returns to its normal position by the action of the spring K.

As illustrated in Fig. 5, a second roller I' may be journaled in the frame J and arranged in such a manner as to move in frictional contact with the roller H at the time the frame J is pressed forward by the roller I moving in contact with the tire of the wheel to be braked. By this arrangement the braking force is increased by the addition of frictional contact between the rollers H and I.

Each of the rollers H, I, or I' is provided with a bushing H' made of metal and mounted on a spindle $H^2$, preferably made of steel and secured in the sides of the lever C or the frame J.

It will be seen that by the arrangement described the wear on the tire is considerably reduced, as the roller I revolves with the tire, and consequently a rolling contact is produced instead of a sliding contact, as is the case on the brakes now used on bicycle-wheels.

Having thus fully described my invention, I claim as new and desire to secure by Letters Patent—

1. A bicycle brake, comprising a lever fulcrumed on the bicycle frame, a roller mounted in the lower end of the lever, a spring pressed frame fulcrumed on the lever and extending down in rear of and below the lever, and a roller mounted in the lower end of the frame and adapted to engage the tire of the bicycle wheel and the roller of the lever, substantially as described.

2. A bicycle brake, comprising a lever fulcrumed on the bicycle frame, a spring for holding the lever in a normal position, a roller mounted in the lower end of the lever, a frame pivoted to the lever and extending down in rear of and below the lever, a spring connected with the lever and frame, and a roller mounted in the lower end of the frame and adapted to engage the tire of the bicycle wheel and the roller of the lever, substantially as described.

RICHARD T. ADDY.

Witnesses:
SAMUEL J. LARGE,
EDWIN A. HILER.